United States Patent
Zhang et al.

(10) Patent No.: US 10,409,694 B2
(45) Date of Patent: Sep. 10, 2019

(54) DATA CONVERSION METHOD AND BACKUP SERVER

(71) Applicant: Huawei Technologies Co., Ltd., Shenzhen (CN)

(72) Inventors: Lei Zhang, Chengdu (CN); Gaoding Fu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/972,527

(22) Filed: May 7, 2018

(65) Prior Publication Data

US 2018/0253359 A1 Sep. 6, 2018

Related U.S. Application Data

(63) Continuation of application No. PCT/CN2016/112184, filed on Dec. 26, 2016.

(51) Int. Cl.
*G06F 11/14* (2006.01)
*G06F 16/27* (2019.01)
(Continued)

(52) U.S. Cl.
CPC ...... *G06F 11/1464* (2013.01); *G06F 11/1435* (2013.01); *G06F 11/1451* (2013.01);
(Continued)

(58) Field of Classification Search
CPC .......... G06F 11/1464; G06F 11/1469; G06F 11/1435; G06F 17/30575; G06F 11/1451;
(Continued)

(56) References Cited

U.S. PATENT DOCUMENTS 7,769,722 B1 * 8/2010 Bergant ............... G06F 16/184
707/681
8,706,833 B1 * 4/2014 Bergant ............... G06F 16/1756
709/214
(Continued)

FOREIGN PATENT DOCUMENTS

CN 102053802 A 5/2011
CN 105955836 A 9/2016

OTHER PUBLICATIONS

Machine Translation and Abstract of Chinese Publication No. CN102053802, May 11, 2011, 27 pages.
(Continued)

*Primary Examiner* — Mano Padmanabhan
*Assistant Examiner* — Jean C Edouard
(74) *Attorney, Agent, or Firm* — Conley Rose, P.C.

(57) ABSTRACT

In a method for implementing data conversion in a cloud data center, a backup server receives a read request from a block storage server. The read request includes a uniform resource locator (URL) address of a to-be-read virtual image object on the backup server and an address range of target data in the to-be-read virtual image object. The backup server obtains an address mapping bitmap and a storage path of backup data in a backup replica corresponding to the to-be-read virtual image object according to the URL address. Thereafter, the backup server obtains the target data from a storage device according to the address range of the target data and the address mapping bitmap and the storage path. Further, the backup server sends the target data to the block storage server. Hence, the conversion time of a backup data object may be shortened.

12 Claims, 8 Drawing Sheets

(51) Int. Cl.
  *G06F 16/25* (2019.01)
  *G06F 17/00* (2019.01)
  *G06F 16/955* (2019.01)
(52) U.S. Cl.
  CPC ........ *G06F 11/1469* (2013.01); *G06F 16/258* (2019.01); *G06F 16/27* (2019.01); *G06F 16/955* (2019.01); *G06F 17/00* (2013.01)
(58) Field of Classification Search
  CPC .... G06F 17/30569; G06F 17/00; G06F 16/27; G06F 16/9024; G06F 16/258; G06F 16/288; G06F 16/955; G06F 11/14; G06F 17/30; G06F 17/30165; G06F 17/30144; G06F 17/30604; G06F 17/24
  USPC ........................................................ 711/162
  See application file for complete search history.

(56) References Cited

U.S. PATENT DOCUMENTS

| | | | |
|---|---|---|---|
| 2004/0034807 A1* | 2/2004 | Rostowfske | G06F 11/2097 714/4.1 |
| 2007/0180450 A1 | 8/2007 | Croft et al. | |
| 2011/0145199 A1* | 6/2011 | Prasad Palagummi | G06F 11/1435 707/654 |
| 2012/0005467 A1 | 1/2012 | Butler et al. | |
| 2013/0110778 A1* | 5/2013 | Taylor | G06F 11/1435 707/624 |
| 2013/0110779 A1* | 5/2013 | Taylor | G06F 16/1844 707/624 |
| 2013/0117240 A1* | 5/2013 | Taylor | G06F 16/182 707/690 |
| 2013/0311612 A1* | 11/2013 | Dickinson | H04L 67/1097 709/219 |
| 2013/0318051 A1* | 11/2013 | Kumar | G06F 16/1748 707/692 |
| 2013/0339407 A1* | 12/2013 | Sharpe | G06F 3/0611 707/827 |
| 2014/0013322 A1* | 1/2014 | Freimuth | G06F 8/63 718/1 |
| 2014/0236868 A1* | 8/2014 | Cook | A01G 25/16 705/412 |

OTHER PUBLICATIONS

Machine Translation and Abstract of Chinese Publication No. CN105955836, Sep. 21, 2016, 11 pages.
Foreign Communication From A Counterpart Application, PCT Application No. PCT/CN2016/112184, International Search Report dated Sep. 4, 2017, 7 pages.
Foreign Communication From A Counterpart Application, PCT Application No. PCT/CN2016/112184, Written Opinion dated Sep. 4, 2017, 4 pages.
Foreign Communication From A Counterpart Application, European Application No. 16915408.5, Extended European Search Report dated Oct. 22, 2018, 8 pages.

* cited by examiner

DATA CONVERSION METHOD AND BACKUP SERVER

CROSS-REFERENCE TO RELATED APPLICATIONS

This application is a continuation of International Patent Application No. PCT/CN2016/112184 filed on Dec. 26, 2016, which is hereby incorporated by reference in its entirety.

TECHNICAL FIELD

This application relates to the field of storage technologies, and in particular, to a method for implementing data conversion in a cloud data center and a backup server.

BACKGROUND

In current hybrid cloud backup, data of a virtual machine (VM) or a physical machine (PM) of a non-public-cloud data center is backed up locally in a unit of a volume. Alternatively, after being backed up locally, the data is then remotely replicated to a cost-effective storage device in a cloud data center, and is restored to a VM (which may also be referred to as a cloud host) of the cloud data center using a backup server in the cloud data center in order to achieve purposes of redundancy and data backup.

Backup data generated in each backup is referred to as a backup replica. The backup replica includes multiple backup data objects. An object is a basic unit of data storage in an object storage technology. One object is a combination of file data and a group of attribute information (metadata). When backup software backs up, in a form of an object, the VM/PM data to the storage device, the VM/PM data is stored in a form of a backup replica. However, a format type of data that can be registered with the cloud data center is a data format of an image object. Therefore, the backup server needs to create, on the storage device and based on the backup replica, an image object that is corresponding to the backup replica and that can be registered with the cloud data center. Herein, an image means an image in the cloud data center. An image object is an object in the cloud data center that is compatible with the cloud data center and that can be used to create a VM and a disk of the VM.

However, in a procedure of creating the image object on the storage device of the cloud data center, in an aspect, because the backup server needs to first read the backup replica from the storage device and then deliver a write operation request to the storage device to form the image object, a lot of time has been spent because of a large amount of input-output (IO) before a cloud disk of the VM is created. In another aspect, because a user's storage space on the storage device needs to be used for creating the image object on the storage device, cloud data center storage costs of the user increase.

SUMMARY

Embodiments of this application provide a method for implementing data conversion in a cloud data center and a backup server in order to shorten a conversion time of a backup data object and reduce cloud data center storage costs of a user when a cloud disk of a VM is created.

To achieve the foregoing objective, the embodiments of this application provide the following technical solutions.

According to a first aspect, a method for implementing data conversion in a cloud data center is provided, where the cloud data center includes a backup server, a block storage server, and a storage device, the backup server stores a virtual image object that is corresponding to a backup replica and that is on the storage device and a uniform resource locator (URL) address of the virtual image object on the backup server, and the method includes receiving, by the backup server, a read request sent by the block storage server, where the read request includes a URL address of a to-be-read virtual image object on the backup server and an address range of target data in the to-be-read virtual image object, obtaining, by the backup server according to the URL address of the to-be-read virtual image object on the backup server, an address mapping bitmap and a storage path that are of backup data in a backup replica corresponding to the to-be-read virtual image object, obtaining, by the backup server, the target data from the storage device according to the address range of the target data and the address mapping bitmap and the storage path that are of the backup data in the backup replica, and sending, by the backup server, the target data to the block storage server. Based on the method for implementing data conversion in a cloud data center that is provided in the embodiments of this application, in an aspect, because in the embodiments of this application, the backup server obtains, by virtualization, the virtual image object instead of generating a real image object on the storage device, storage space on the storage device can be saved for a user, and cloud data center storage costs of the user are reduced. In another aspect, in the embodiments of this application, the block storage server can directly read the backup data on the storage device using the backup server, instead of reading, by the backup server, the backup replica from the storage device, delivering a write operation request to the storage device to form an image object, and reading, by the block storage server, the backup data from the image object. Therefore, when a cloud disk of a VM is created, read IO and write IO performed for generating the real image object can be eliminated, and a conversion time of a backup data object is shortened.

In a possible design, before receiving, by the backup server, a read request sent by the block storage server, the method further includes obtaining, by the backup server, an identifier of the backup replica, searching, by the backup server, a local database according to the identifier of the backup replica, obtaining a storage path of metadata in the backup replica, obtaining, by the backup server, the metadata from the storage device according to the storage path of the metadata, creating, by the backup server, the to-be-read virtual image object according to the metadata, generating, by the backup server, the URL address of the created virtual image object, and sending, by the backup server, the URL address of the created virtual image object to an image server. According to the foregoing method, the virtual image object can be obtained, by virtualization, on the backup server.

In a possible design, obtaining, by the backup server according to the URL address of the to-be-read virtual image object on the backup server, an address mapping bitmap and a storage path that are of backup data in a backup replica corresponding to the to-be-read virtual image object includes determining, by the backup server, an identifier of the to-be-read virtual image object according to the URL address of the to-be-read virtual image object on the backup server, obtaining, by the backup server, pre-stored metadata in the to-be-read virtual image object according to the identifier of the to-be-read virtual image object, where the metadata includes a storage path of the address mapping bitmap of the backup data in the backup replica corresponding to the to-be-read virtual image object and the storage path of the backup data in the backup replica, and obtaining, by the backup server, the address mapping bitmap of the backup data in the backup replica from the storage device according to the storage path of the address mapping bitmap of the backup data in the backup replica. That is, in the embodiments of this application, the backup server may obtain, according to the pre-stored metadata in the to-be-read virtual image object, the address mapping bitmap and the storage path that are of the backup data in the backup replica corresponding to the to-be-read virtual image object.

In a possible design, obtaining, by the backup server according to the URL address of the to-be-read virtual image object on the backup server, an address mapping bitmap and a storage path that are of backup data in a backup replica corresponding to the to-be-read virtual image object includes determining, by the backup server, an identifier of the to-be-read virtual image object according to the URL address of the to-be-read virtual image object on the backup server, and obtaining, by the backup server according to the identifier of the to-be-read virtual image object, the pre-stored address mapping bitmap and storage path that are of the backup data in the backup replica corresponding to the to-be-read virtual image object. That is, in the embodiments of this application, the address mapping bitmap and the storage path that are of the backup data in the backup replica corresponding to the virtual image object may be obtained only once in an entire procedure of accessing the virtual image object, and then stored locally on the backup server. During subsequent use, the pre-stored address mapping bitmap and storage path that are of the backup data in the backup replica corresponding to the to-be-read virtual image object can be obtained from the backup server according to the URL address of the to-be-read virtual image object on the backup server.

In a possible design, obtaining, by the backup server, the target data from the storage device according to the address range of the target data and the address mapping bitmap and the storage path that are of the backup data in the backup replica includes obtaining, by the backup server from the storage device according to the address range of the target data and the address mapping bitmap and the storage path that are of the backup data in the backup replica, backup data that needs to be read, and obtaining, by the backup server, the target data according to the backup data that needs to be read and the address range of the target data. That is, in the embodiments of this application, the backup server may first obtain, from the storage device, the backup data that needs to be read, and then obtain the target data according to the backup data that needs to be read and the address range of the target data.

In a possible design, obtaining, by the backup server from the storage device according to the address range of the target data and the address mapping bitmap and the storage path that are of the backup data in the backup replica, backup data that needs to be read includes determining, by the backup server according to the address range of the target data and the address mapping bitmap of the backup data in the backup replica, the backup data that needs to be read, obtaining, according to the address mapping bitmap and the storage path that are of the backup data in the backup replica, a storage path, on the storage device, of the backup data that needs to be read, creating, by the backup server according to the storage path, on the storage device, of the backup data that needs to be read, a data read request for the backup data that needs to be read, where the data read request includes the storage path, on the storage device, of the backup data that needs to be read, sending, by the backup server, the data read request to the storage device, and receiving, by the backup server, the backup data that needs to be read and that is sent by the storage device. In the foregoing manner, the backup data that needs to be read can be obtained from the storage device.

In a possible design, obtaining, by the backup server, the target data according to the backup data that needs to be read and the address range of the target data includes combining, by the backup server, data that is of different backup data objects and that is in the backup data that needs to be read to obtain the target data if the address range of the target data is larger than an address range of a backup data object in the backup replica. For a specific example, refer to the part of specific implementations. Details are not described herein.

In a possible design, obtaining, by the backup server, the target data according to the backup data that needs to be read and the address range of the target data includes capturing, by the backup server from the backup data that needs to be read, data corresponding to the address range of the target data, and setting the data as the target data if the address range of the target data is not larger than an address range of a backup data object in the backup replica. For a specific example, refer to the part of specific implementations. Details are not described herein.

In a possible design, obtaining, by the backup server, the target data from the storage device according to the address range of the target data and the address mapping bitmap and the storage path that are of the backup data in the backup replica includes determining, by the backup server according to the address range of the target data and the address mapping bitmap of the backup data in the backup replica, backup data that needs to be read, obtaining, according to the address mapping bitmap and the storage path that are of the backup data in the backup replica, a storage path, on the storage device, of the backup data that needs to be read if the address range of the target data is not larger than an address range of a backup data object in the backup replica, creating, by the backup server according to the storage path, on the storage device, of the backup data that needs to be read, a data read request for the backup data that needs to be read, where the data read request includes the storage path, on the storage device, of the backup data that needs to be read and the address range of the target data, sending, by the backup server, the data read request to the storage device, and receiving, by the backup server, the target data sent by the storage device. That is, in the embodiments of this application, data may be further read from the storage device in a piece-wise reading manner, or a more specific address range may be specified. For a specific example, refer to the part of specific implementations. Details are not described herein.

According to a second aspect, a backup server is provided, where the backup server includes an object storage presentation module, an IO interception and analysis module, and an IO forwarding layer, where the object storage presentation module is configured to store a virtual image object that is corresponding to a backup replica and that is on a storage device and a URL address of the virtual image object on the backup server, the object storage presentation module is further configured to receive a read request sent by the block storage server, where the read request includes a URL address of a to-be-read virtual image object on the backup server and an address range of target data in the to-be-read virtual image object, the object storage presentation module is further configured to obtain, according to the URL address of the to-be-read virtual image object on the backup server, an address mapping bitmap and a storage path that are of backup data in a backup replica corresponding to the to-be-read virtual image object, the IO interception and analysis module is configured to intercept the address range of the target data and the address mapping bitmap and the storage path that are of the backup data in the backup replica, where the address range of the target data and the address mapping bitmap and the storage path that are of the backup data in the backup replica are on the object storage presentation module, and obtain the target data from the storage device using the IO forwarding layer and according to the address range of the target data and the address mapping bitmap and the storage path that are of the backup data in the backup replica, and the object storage presentation module is further configured to send, to the block storage server, the target data obtained by the IO interception and analysis module.

In a possible design, the back server further includes a backup module, where the backup module is configured to obtain an identifier of the backup replica before the object storage presentation module receives the read request sent by the block storage server, the backup module is further configured to search a local database according to the identifier of the backup replica, and obtain a storage path of metadata in the backup replica, the object storage presentation module is further configured to obtain the metadata from the storage device using the IO forwarding layer and according to the storage path that is of the metadata and that is obtained by the backup module, the object storage presentation module is further configured to create the to-be-read virtual image object according to the metadata, and generate the URL address of the created virtual image object, and the backup module is further configured to send, to an image server, the URL address of the virtual image object created by the object storage presentation module.

In a possible design, obtaining, by the object storage presentation module according to the URL address of the to-be-read virtual image object on the backup server, an address mapping bitmap and a storage path that are of backup data in a backup replica corresponding to the to-be-read virtual image object includes determining an identifier of the to-be-read virtual image object according to the URL address of the to-be-read virtual image object on the backup server, and obtaining, according to the identifier of the to-be-read virtual image object, metadata that is in the to-be-read virtual image object and that is pre-stored on the object storage presentation module, where the metadata includes a storage path of the address mapping bitmap of the backup data in the backup replica corresponding to the to-be-read virtual image object and the storage path of the backup data in the backup replica, and obtaining the address mapping bitmap of the backup data in the backup replica from the storage device using the IO forwarding layer and according to the storage path of the address mapping bitmap of the backup data in the backup replica.

In a possible design, obtaining, by the object storage presentation module according to the URL address of the to-be-read virtual image object on the backup server, an address mapping bitmap and a storage path that are of backup data in a backup replica corresponding to the to-be-read virtual image object includes determining an identifier of the to-be-read virtual image object according to the URL address of the to-be-read virtual image object on the backup server, and obtaining, according to the identifier of the to-be-read virtual image object, the pre-stored address mapping bitmap and storage path that are of the backup data in the backup replica corresponding to the to-be-read virtual image object.

In a possible design, obtaining, by the IO interception and analysis module, the target data from the storage device using the IO forwarding layer and according to the address range of the target data and the address mapping bitmap and the storage path that are of the backup data in the backup replica includes obtaining, from the storage device using the IO forwarding layer and according to the address range of the target data and the address mapping bitmap and the storage path that are of the backup data in the backup replica, backup data that needs to be read, and obtaining the target data according to the backup data that needs to be read and the address range of the target data.

In a possible design, the obtaining, by the IO interception and analysis module from the storage device using the IO forwarding layer and according to the address range of the target data and the address mapping bitmap and the storage path that are of the backup data in the backup replica, backup data that needs to be read includes determining, according to the address range of the target data and the address mapping bitmap of the backup data in the backup replica, the backup data that needs to be read, obtaining, according to the address mapping bitmap and the storage path that are of the backup data in the backup replica, a storage path, on the storage device, of the backup data that needs to be read, creating, according to the storage path, on the storage device, of the backup data that needs to be read, a data read request for the backup data that needs to be read, where the data read request includes the storage path, on the storage device, of the backup data that needs to be read, sending the data read request to the storage device using the IO forwarding layer, and receiving, using the IO forwarding layer, the backup data that needs to be read and that is sent by the storage device.

In a possible design, obtaining, by the IO interception and analysis module, the target data according to the backup data that needs to be read and the address range of the target data includes combining, by the IO interception and analysis module, data that is of different backup data objects and that is in the backup data that needs to be read to obtain the target data if the address range of the target data is larger than an address range of a backup data object in the backup replica. For a specific example, refer to the part of specific implementations. Details are not described herein.

In a possible design, the obtaining, by the IO interception and analysis module, the target data according to the backup data that needs to be read and the address range of the target data includes capturing, by the IO interception and analysis module from the backup data that needs to be read, data corresponding to the address range of the target data, and using the data as the target data if the address range of the target data is not larger than an address range of a backup data object in the backup replica. For a specific example, refer to the part of specific implementations. Details are not described herein.

In a possible design, obtaining, by the IO interception and analysis module, the target data from the storage device using the IO forwarding layer and according to the address range of the target data and the address mapping bitmap and the storage path that are of the backup data in the backup replica includes determining, according to the address range of the target data and the address mapping bitmap of the backup data in the backup replica, backup data that needs to be read, and obtaining, according to the address mapping bitmap and the storage path that are of the backup data in the backup replica, a storage path, on the storage device, of the backup data that needs to be read if the address range of the target data is not larger than an address range of a backup data object in the backup replica, creating, according to the storage path, on the storage device, of the backup data that needs to be read, a data read request for the backup data that needs to be read, where the data read request includes the storage path, on the storage device, of the backup data that needs to be read and the address range of the target data, sending the data read request to the storage device using the IO forwarding layer, and receiving, using the IO forwarding layer, the target data sent by the storage device.

According to a third aspect, a backup server is provided, including a processor, a memory, a bus, and a communications interface, where the memory is configured to store a computer-executable instruction, the processor is connected to the memory using the bus, and when the backup server runs, the processor executes the computer-executable instruction stored in the memory to enable the backup server to execute the method for implementing data conversion in a cloud data center according to any one of the first aspect or the possible designs of the first aspect.

According to a fourth aspect, a computer storage medium is provided configured to store a computer software instruction used by a backup server. The computer software instruction includes a program designed to execute the foregoing method embodiments. By executing the stored program, a data conversion method can be implemented in a cloud data center.

According to a fifth aspect, a computer program is provided, where the computer program includes an instruction, and when the computer program is executed by a computer, the computer can execute the method for implementing data conversion in a cloud data center according to any one of the first aspect.

According to a sixth aspect, a cloud data center system is provided. The cloud data center system includes a block storage device, an image server, a storage device, and the backup server according to any one of the second aspect or the third aspect. The image server is configured to receive and store a URL address that is of a created virtual image object and that is sent by the backup server. The block storage server is configured to obtain, by querying, the URL address of the created virtual image object from the image server, and send a read request to the backup server. The block storage server is further configured to receive target data sent by the backup server, and create a cloud disk of a VM according to the target data.

In addition, for a technical effect brought by any design manner in the second aspect to the fifth aspect, refer to technical effects brought by different design manners in the first aspect. Details are not described herein again.

DESCRIPTION OF EMBODIMENTS

The following describes the technical solutions in the embodiments of this application with reference to the accompanying drawings in the embodiments of this application. In descriptions of this application, unless otherwise specified, "/" indicates a meaning of or. For example, A/B may indicate A or B. "And/or" in the specification describes only an association relationship between associated objects, and indicates that three relationships may exist. For example, A and/or B may indicate the following three cases: A exists alone, both A and B exist, and B exists alone. In addition, in the descriptions of this application, "multiple" indicates two or more than two.

The embodiments of this application provide a method for implementing data conversion in a cloud data center. The method may be applied to a hybrid cloud backup system, that is, data conversion is implemented when data of a non-public-cloud data center is backed up to a cloud data center. The method may also be applied to a cloud backup system, that is, data conversion is implemented when data of a cloud data center is backed up to another cloud data center. In the embodiments of this application, the hybrid cloud backup system is used as an example for description.

Figure 1:
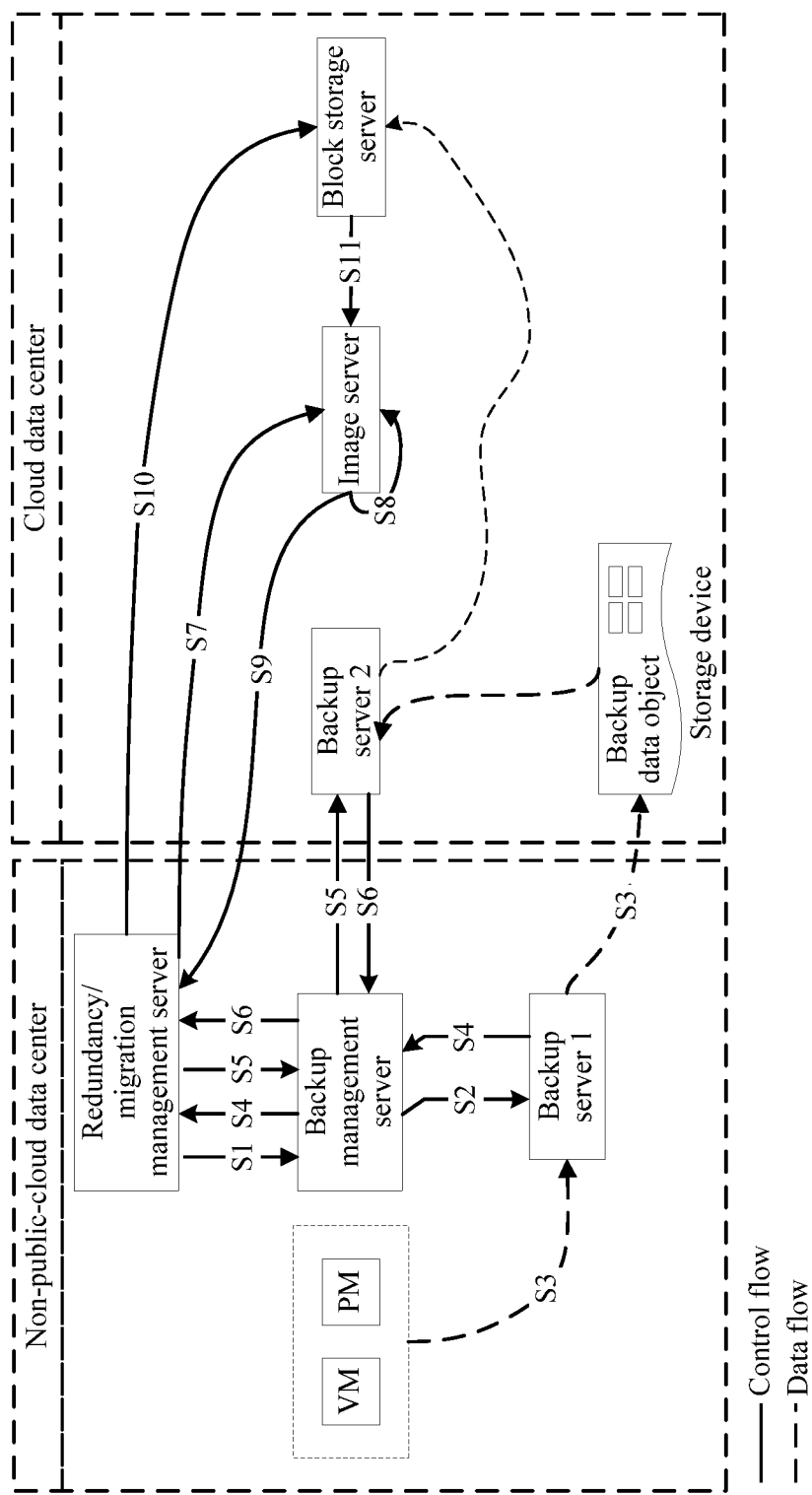
FIG. 1 is a logical block diagram of a hybrid cloud backup system according to an embodiment of this application.

Referring to FIG. 1, FIG. 1 is a logical block diagram of a hybrid cloud backup system according to an embodiment of this application. The hybrid cloud backup system includes a non-public-cloud data center and a cloud data center. A VM and/or a PM, a redundancy/migration management server, a backup management server, and a backup server 1 are deployed in the non-public-cloud data center. A backup server 2, a storage device, an image server, and a block storage server are deployed in the cloud data center. The storage device stores data by means of object storage. The following briefly describes the devices in the non-public-cloud data center and the cloud data center.

The VM/PM is a machine that provides a service for a user. For example, a file server or a database server may exist in a form of the VM/PM.

The redundancy/migration management server controls an entire redundancy and data migration process.

The backup management server is a management server configured to schedule backup-related tasks to different backup servers.

The backup server is a server that executes a backup-related task. There may be multiple backup servers, which are distributed at different sites and are all managed by the backup management server. Herein, the sites include the non-public-cloud data center and the cloud data center. As shown in FIG. 1, the backup server 1 is distributed in the non-public-cloud data center, and the backup server 2 is distributed in the cloud data center. Certainly, FIG. 1 merely shows two backup servers as an example. This embodiment of this application does not limit a quantity of backup servers.

The storage device is deployed in the cloud data center, and stores data using an object storage technology. The storage device may provide a storage service for a non-public-cloud tenant by means of object storage, or may provide a storage service for a cloud server by means of object storage, for example, AMAZON WEB SERVICES (AWS).

The image server is a server configured to manage a cloud host image. The cloud host image is used to create a VM in the cloud data center according to an image object. In this embodiment of this application, the backup server creates a virtual image object, and the virtual image object is externally presented in a manner of an object storage interface. The externally presented virtual image object is like an image object. Compared with the image object, the virtual image object includes only a metadata object, and does not include a backup data object. In addition, a storage path of a data object in the metadata object in the virtual image object points to a data object that is of a backup replica and that is on the storage device. However, in addition to a metadata object, the image object further includes a backup data object, and a storage path of a data object in the metadata object points to a data object in the image object. Therefore, in this embodiment of this application, the cloud host image is actually used to create a VM in the cloud data center according to the virtual image object. In addition, a core of creating the VM is to create a cloud disk of the VM in the cloud data center. Therefore, in this embodiment of this application, a core of the cloud host image is to create the cloud disk of the VM in the cloud data center according to the virtual image object. In this embodiment of this application, the image server records a URL address of each virtual image object. For example, a URL address of a virtual image object of backup-2 may be http://BackupServer-IP//IMG-objectID-Backup-2. BackupServer-IP is an Internet Protocol (IP) address of a backup server that obtains, by virtualization, the virtual image object, and IMG-objectID-Backup-2 is an identifier of the virtual image object of the backup-2. In addition, the image server further records some metadata information of the virtual image object, such as an identifier of the virtual image object and a format and a size of the virtual image object. In this embodiment of this application, the VM, especially the cloud disk of the VM, needs to be created in the cloud data center based on the virtual image object. The image server manages all virtual image objects, and provides services such as image object registration and querying.

The block storage server is a server configured to create the cloud disk of the VM. Generally, an address of the image object is obtained from the image server, and data of the image object is obtained from the storage device according to the address of the image object to create the disk of the VM. In this embodiment of this application, the address of the image object includes the URL address of the virtual image object.

Based on the foregoing devices in the non-public-cloud data center and the cloud data center, the following briefly describes a process of creating the cloud disk of the VM in the hybrid cloud backup system. In this method embodiment, the backup server 1 is located in the non-public-cloud data center, and the backup server 2 is located in the cloud data center. A specific implementation process is as follows.

Step S1. The redundancy/migration management server sends, to the backup management server, a request for backing up a specified VM/PM, where the request carries an identifier of the specified VM/PM and a destination address for backup. In this embodiment of this application, the destination address for backup is actually a URL address of the storage device.

Step S2. The backup management server sends an instruction to the backup server 1, where the instruction instructs the backup server 1 to back up, in a form of an object and according to the identifier of the VM/PM and the destination address for backup, disk data of the specified VM/PM to the storage device in the cloud data center.

Step S3. The backup server 1 backs up the disk data of the specified VM/PM to the storage device in the cloud data center to obtain a backup replica, where a format of the backup replica on the storage device can be identified only by backup software on the backup server 1. The backup server 1 automatically generates a name of a backup data object, and obtains a storage path of the backup data object with reference to the URL address of the storage device. For example, if the URL address of the storage device is http://IP and the name of the backup data object is Object-1, the storage path of the backup data object is http://IP/Object-1.

Further, in this embodiment of this application, backup data generated in one backup is referred to as a backup replica, and the backup replica includes multiple backup data objects. For example, the backup replica includes multiple backup data objects, an address mapping bitmap object of the backup data (also referred to as an address mapping bitmap object), and a metadata object of the backup replica. Data in each backup data object is backup data, and values of addresses of backup data in the multiple backup data objects increase progressively according to address locations of data on an original disk of the VM or the PM. Data of the address mapping bitmap object is an address mapping bitmap. Data of the metadata object is metadata. Typically, the backup data is split into several data blocks of a same size, and each data block is a backup data object on the storage device. The address mapping bitmap specifies backup data objects that need to be included for forming a complete disk during a specific backup of a disk of a VM. The metadata includes a size of the disk of the VM in a current backup, a time point of a backup replica, a storage path of the backup replica, and the like. Herein, the storage path of the backup replica is actually the URL address of the storage device, for example, may be http://IP.

Figure 2:
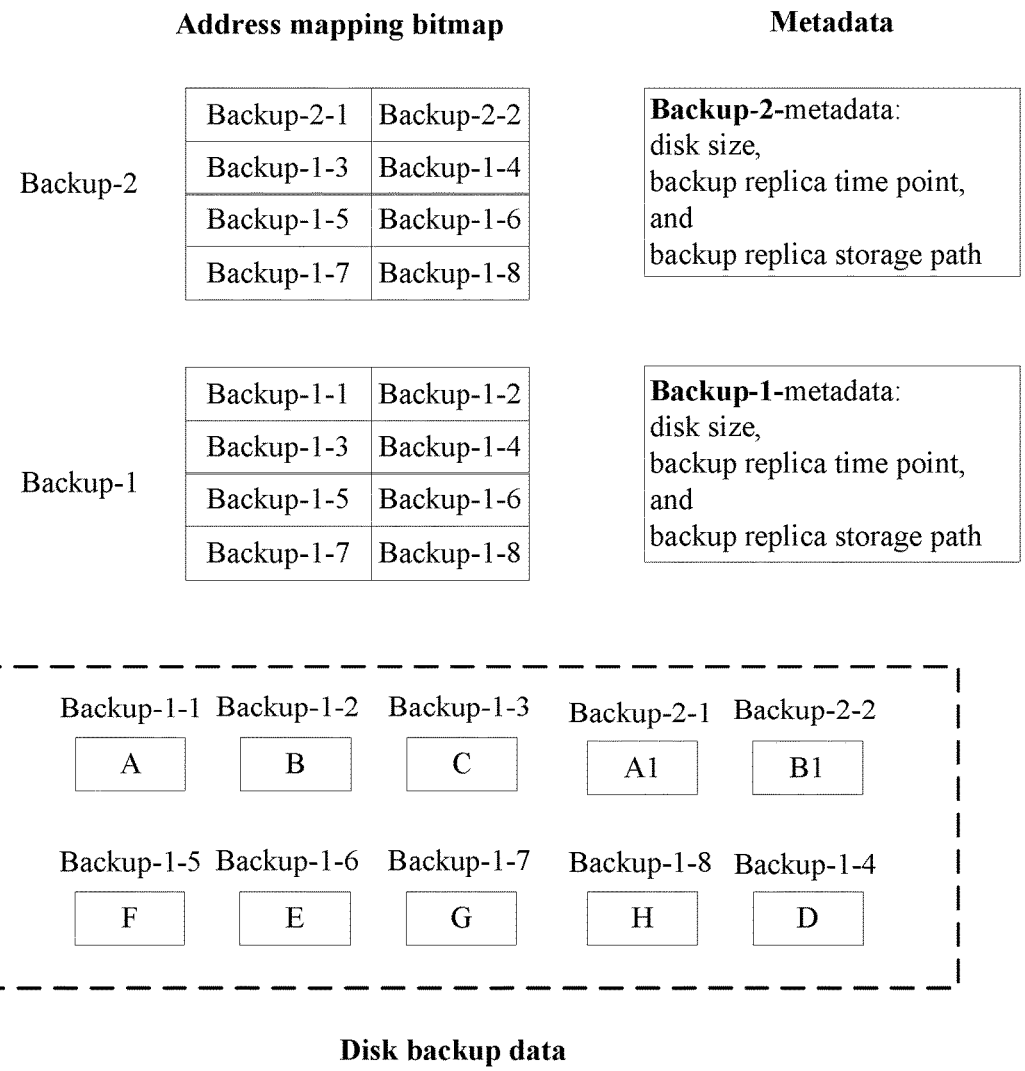
FIG. 2 is a schematic diagram of a data object on a storage device according to an embodiment of this application.

As shown in FIG. 2, the following explains a backup procedure of the disk of the VM using an example in which a 32-megabyte (MB) disk is split by taking 4 MB as an object.

Values of addresses of backup data in multiple backup data objects generated in a first backup (designated as Backup-1 in FIG. 2) increase progressively according to address locations of data on an original disk of a VM or a PM, and are sequentially backup-1-1 to backup-1-8. The backup-1-1 is the first backup data object for the first backup, and stores data of the disk in a range of 0-4 MB, the backup-1-2 is the second backup data object for the first backup, and stores data of the disk in a range of 5-8 MB, and so on. After the first backup, backup data includes data A of the backup-1-1, data B of the backup-1-2, data C of the backup-1-3, data D of the backup-1-4, data F of the backup-1-5, data E of the backup-1-6, data G of the backup-1-7, and data H of the backup-1-8.

An address mapping bitmap generated in the first backup is also stored on the storage device in a manner of an object. The address mapping bitmap includes names of all backup data objects that need to be included for forming a complete disk in the current backup, and sequentially stores the names according to the address locations of the data on the original disk of the VM or the PM, for example, the backup-1-1, the backup-1-2, the backup-1-3, the backup-1-4, the backup-1-5, the backup-1-6, the backup-1-7, and the backup-1-8 in FIG. 2.

Only two of backup data objects generated in the second backup (designated as Backup-2 in FIG. 2) change. However, an address mapping bitmap generated in the second backup still includes names of all backup data objects that need to be included for forming a complete disk at a time point of backup-2, such as backup-2-1, backup-2-2, the backup-1-3, the backup-1-4, the backup-1-5, the backup-1-6, the backup-1-7, and the backup-1-8 in FIG. 2. The backup-2-1 is the first backup data object for the second backup, and stores data of the disk in a range of 0-4 MB, the backup-2-2 is the second backup data object for the second backup, and stores data of the disk in a range of 5-8 MB, and so on.

Only two of the backup data objects generated in the second backup change. Therefore, after the second backup, backup data includes data A1 of the backup-2-1, data B1 of the backup-2-2, the data C of the backup-1-3, the data D of the backup-1-4, the data F of the backup-1-5, the data E of the backup-1-6, the data G of the backup-1-7, and the data H of the backup-1-8.

That is, in the two backup processes, as shown in FIG. 2, the backup data includes the data A of the backup-1-1, the data B of the backup-1-2, the data C of the backup-1-3, the data D of the backup-1-4, the data F of the backup-1-5, the data E of the backup-1-6, the data G of the backup-1-7, the data H of the backup-1-8, the data Al of the backup-2-1, and the data B1 of the backup-2-2.

According to the foregoing definition of the backup replica, the backup replica in this example includes the backup data objects, the address mapping bitmap object, and a metadata object (e.g. Backup-2-matadata and Backup-1-matadata) in FIG. 2.

Step S4. The backup server 1 sends the storage path of the backup data object to the redundancy/migration management server using the backup management server.

Step S5. The redundancy/migration management server sends an instruction to the backup server 2 in the cloud data center using the backup management server, where the instruction carries an identifier of the backup replica, and is used to instruct the backup server 2 to convert a format of the backup data object that is of the backup replica and that is on the storage device, that is, convert the backup data object into an image object that can be identified by the block storage server.

Step S6. The backup server 2 creates a virtual image object according to the selected backup replica, and sends a URL address of the virtual image object to the redundancy/migration management server using the backup management server. This procedure is described in detail in the following procedure of creating the virtual image object in this application. Details are not described herein.

Step S7. The redundancy/migration management server sends an image registration instruction to the image server, where the instruction includes the URL address and an image format type of the virtual image object. The image format type may be, for example, a raw disk, an open virtualization format (OVF), or an open virtualization appliance (OVA). In this embodiment of this application, an example in which the image format type is a raw disk format is used for description. Description is provided herein, and details are not described in the following again.

Step S8. The image server registers the virtual image object, that is, records the URL address and the type of the virtual image object, and assigns an image identifier for the virtual image object.

Step S9. The image server sends the image identifier assigned for the virtual image object to the redundancy/migration management server.

Step S10. The redundancy/migration management server sends, to the block storage server, an instruction message for creating a cloud disk, where the instruction message carries the image identifier assigned for the virtual image object by the image server.

Step S11. The block storage server obtains, by querying according to the image identifier, the URL address of the virtual image object from the image server, and then creates the cloud disk of the VM. This procedure is described in detail in the following data conversion method of this application. Details are not described herein.

In the foregoing step S11, how to shorten a conversion time of the backup data object and reduce cloud data center storage costs of a user is an essential technical problem that needs to be resolved in the embodiments of this application. The following provides description thereof.

Figure 3:
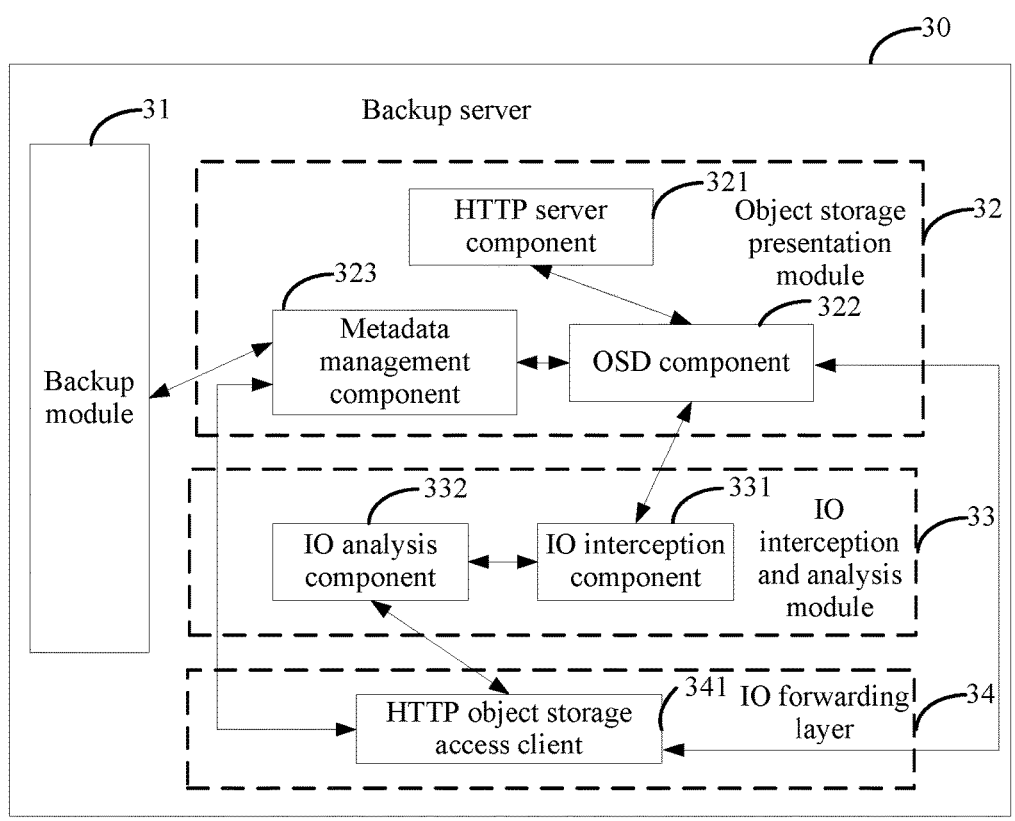
FIG. 3 is a schematic structural diagram of a backup server according to an embodiment of this application.

The method for implementing data conversion in a cloud data center according to the embodiments of this application is mainly implemented by the backup server 2 of the cloud data center in FIG. 1. Referring to FIG. 3, FIG. 3 is a schematic structural diagram of a backup server 30 according to an embodiment of this application. The backup server 30 includes a backup module 31, an object storage presentation module 32, an IO interception and analysis module 33, and an IO forwarding layer 34. The following briefly describes the modules.

The backup module 31 is configured to receive an instruction of a backup management server, such as a backup or recovery instruction, and complete a backup or recovery task. In addition, in this embodiment of this application, the backup module 31 further participates in a task of creating a virtual image object.

The object storage presentation module 32 is configured to externally present a virtual storage device in a manner of an object storage interface. Further, the object storage presentation module 32 includes a hypertext transfer protocol (HTTP) server component 321, an object storage device (OSD) component 322, and a metadata management component 323.

The metadata management component 323 stores metadata such as a size and creation time of the virtual image object.

Logically, the OSD component 322 is a component for storing data. A provided data access interface is an HTTP interface, and the stored data is an object instead of a block or a file. The OSD component 322 uploads or downloads object data using a PUT/Get method of a Representational State Transfer (REST) interface, or the like. In this embodiment of this application, the OSD component 322 does not really store the object data, but is mainly configured to assist the IO interception and analysis module 33 in interception and analysis.

The HTTP server component 321 is configured to respond to various HTTP access requests of an HTTP object storage access client 341, including HTTP access requests of uploading and downloading the object data.

The IO interception and analysis module 33 is configured to intercept a read request and analyze an IO range. In this embodiment of this application, the read request is used to read data in the virtual image object. The read request includes a URL address of a to-be-read virtual image object on the backup server and an address range of target data in the to-be-read virtual image object. For example, the read request may be performing a Get operation on data with an address of 0-8 MB in a virtual image object corresponding to http://BackupServer-IP//IMG-objectID-Backup-2. The URL address of the to-be-read virtual image object on the backup server is http://BackupServer-IP//IMG-objectID-Backup-2, and the address range of the target data is 0-8 MB. Further, the IO interception and analysis module 33 includes an IO interception component 331 and an IO analysis component 332.

The IO interception component 331 is configured to intercept the read request, and send the read request to the IO analysis component 332 after the OSD component 322 obtains the read request.

The IO analysis component 332 is configured to analyze the address range that is of the target data and that is in the read request, and with reference to an address mapping bitmap and a storage path of backup data in a backup replica, decompose the read request into one or more HTTP-based requests for a storage device.

In addition, after receiving backup data that needs to be read and that is sent by the storage device, the IO analysis component 332 is further configured to obtain the target data according to the backup data that needs to be read and the address range of the target data, and then send the target data to the IO interception component 331 to return the target data to the OSD component 322 using the IO interception component 331. For specific implementation of obtaining, by the IO analysis component 332, the target data according to the backup data that needs to be read and the address range of the target data, refer to descriptions in a method embodiment shown in FIG. 4. Details are not described herein.

Alternatively, after receiving the target data sent by the storage device, the IO analysis component 332 is further configured to send the target data to the IO interception component 331 to return the target data to the OSD component 322 using the IO interception component 331. For details, refer to the descriptions in the method embodiment shown in FIG. 4. Details are not described herein.

The IO forwarding layer 34 includes the HTTP object storage access client 341 and is configured to forward an HTTP request for the storage device, and after obtaining the backup data that needs to be read or the target data, forward the backup data that needs to be read or the target data to the IO analysis component 332.

Figure 4:
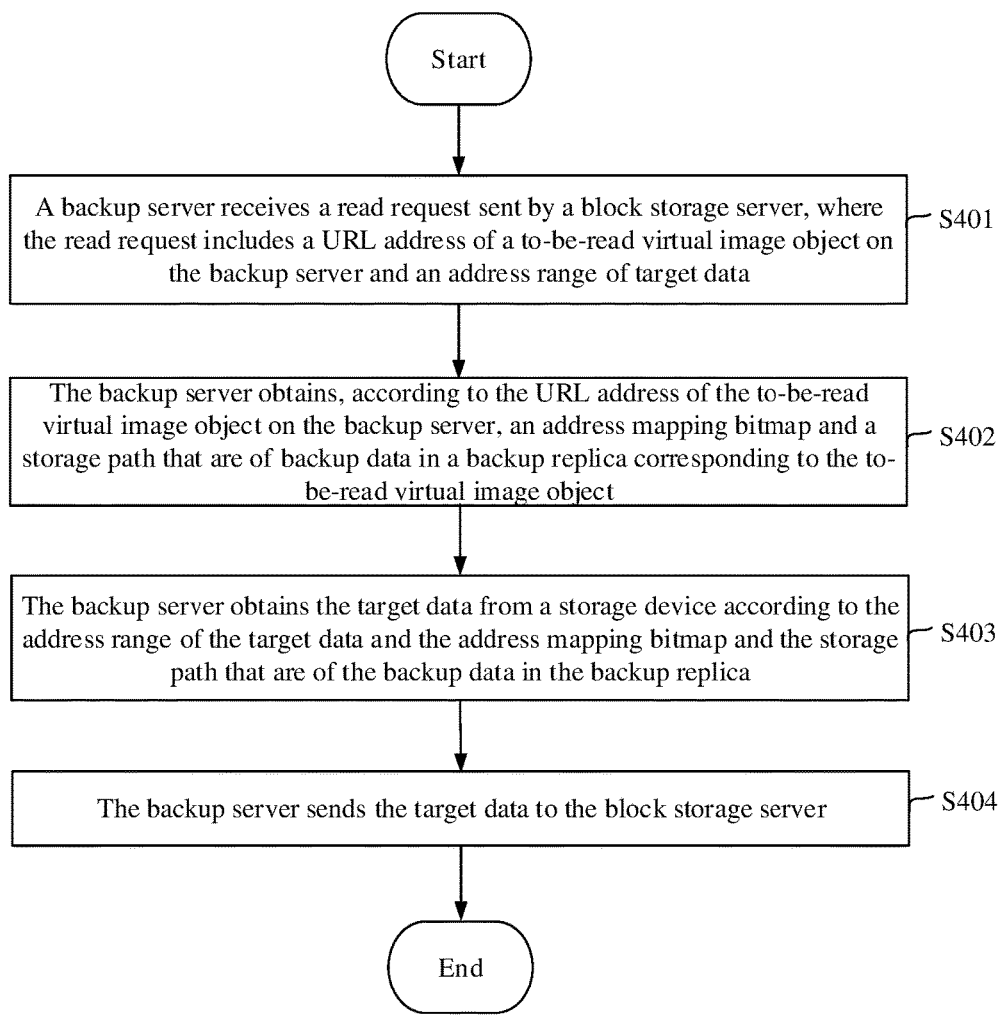
FIG. 4 is a first schematic flowchart of a data conversion method according to an embodiment of this application.

Based on the backup server 30 provided in this embodiment of this application, the following describes a method for implementing data conversion in a cloud data center according to an embodiment of this application. The backup server 30 stores a virtual image object that is corresponding to a backup replica and that is on a storage device and a URL address of the virtual image object on the backup server. As shown in FIG. 4, the method for implementing data conversion in a cloud data center includes the following steps.

Step S401. The backup server receives a read request sent by a block storage server, where the read request includes a URL address of a to-be-read virtual image object on the backup server and an address range of target data in the to-be-read virtual image object.

As described in the foregoing step S6, in this embodiment of this application, the backup server needs to create the virtual image object according to a selected backup replica. A specific creating procedure is described in the following embodiment. Details are not described herein.

A URL address of the virtual image object on the block storage server is obtained, by querying according to an image identifier that is assigned for the virtual image object by an image server and that is carried in an instruction message for creating a cloud disk, by the block storage server from the image server after the block storage server receives the instruction message that is sent by a redundancy/migration management server (refer to the foregoing step S11). A URL address of the virtual image object on the image server is generated by the backup server 30, and is obtained in the foregoing steps S7 and S8 after a backup management server sends the URL address to the redundancy/migration management server. If a URL address of a virtual image object of backup-2 is used as an example, the URL address of the virtual image object may be http://BackupServer-IP/IMG-objectID-Backup-2.

The address range of the target data indicates a range of image object data that needs to be transmitted, for example, data with an address of 0-8 MB.

Figure 5:
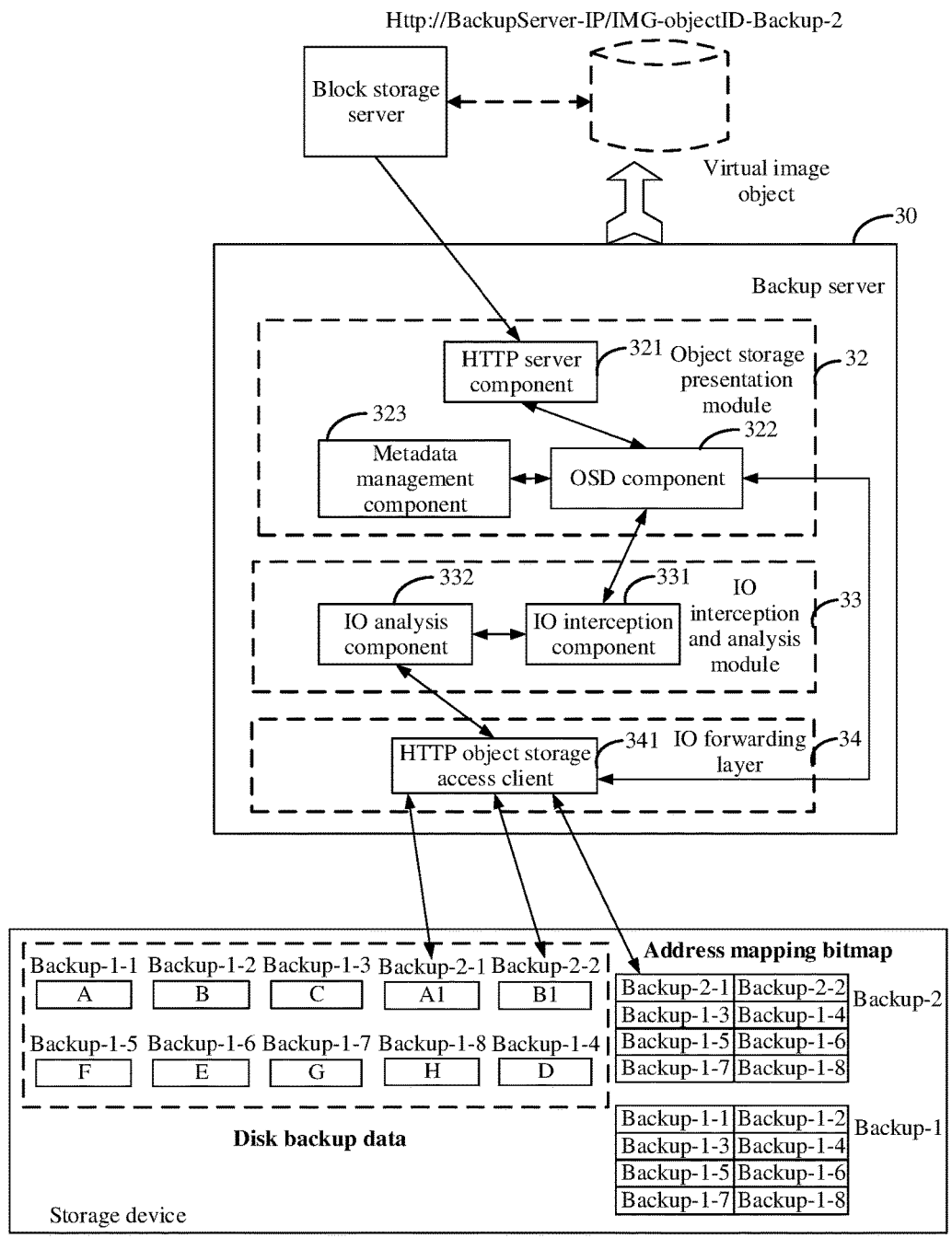
FIG. 5 is an overall schematic block diagram of data conversion according to an embodiment of this application.

Further, with reference to the backup server 30 shown in FIG. 3, FIG. 5 is an overall schematic block diagram of implementing data conversion in a cloud data center by the backup server 30. The HTTP server component 321 in the backup server 30 is configured to support the backup server 30 in executing step S401 in this embodiment of this application.

Step S402. The backup server obtains, according to the URL address of the to-be-read virtual image object on the backup server, an address mapping bitmap and a storage path that are of backup data in a backup replica corresponding to the to-be-read virtual image object.

Optionally, obtaining, by the backup server according to the URL address of the to-be-read virtual image object on the backup server, an address mapping bitmap and a storage path that are of backup data in a backup replica corresponding to the to-be-read virtual image object may include determining, by the backup server, an identifier of the to-be-read virtual image object according to the URL address of the to-be-read virtual image object on the backup server, obtaining, by the backup server, pre-stored metadata in the to-be-read virtual image object according to the identifier of the to-be-read virtual image object, where the metadata includes a storage path of the address mapping bitmap of the backup data in the backup replica corresponding to the to-be-read virtual image object and the storage path of the backup data in the backup replica, and obtaining, by the backup server, the address mapping bitmap of the backup data in the backup replica from the storage device according to the storage path of the address mapping bitmap of the backup data in the backup replica.

For example, as shown in FIG. 5, if the URL address of the to-be-read virtual image object may be http://BackupServer-IP/IMG-objectID-Backup-2, after receiving a read request, the HTTP server component 321 may learn, by analysis, from the URL address of the to-be-read virtual image object, that the identifier of the to-be-read virtual image object is IMG-objectID-Backup-2, that is, the virtual image object corresponding to the backup-2. Further, the HTTP server component 321 may send a data obtaining instruction to the OSD component 322, where the data obtaining instruction carries the identifier of the to-be-read virtual image object and the address range of the target data. After receiving the data obtaining instruction, the OSD component 322 may obtain metadata of the backup-2 in the to-be-read virtual image object from the metadata management component 323 according to the identifier that is of the to-be-read virtual image object and that is carried in the data obtaining instruction. The metadata includes a storage path of an address mapping bitmap of the backup-2 corresponding to the to-be-read virtual image object and a storage path of backup data of the backup-2. Further, using the HTTP object storage access client 341, the OSD component 322 may send a request for obtaining the address mapping bitmap to a real storage device and obtain the address mapping bitmap of the backup-2.

It should be noted that the address mapping bitmap and the storage path that are of the backup data in the backup replica may be obtained only once in an entire procedure of accessing the virtual image object, and then stored locally on the backup server 30. During subsequent use, the pre-stored address mapping bitmap and storage path that are of the backup data in the backup replica corresponding to the to-be-read virtual image object can be obtained from the backup server 30 according to the URL address of the to-be-read virtual image object on the backup server.

Optionally, the backup server may further store a URL address of the backup replica on the storage device. Obtaining, by the backup server according to the URL address of the to-be-read virtual image object on the backup server, an address mapping bitmap and a storage path that are of backup data in a backup replica corresponding to the to-be-read virtual image object may further include obtaining, by the backup server according to the URL address of the to-be-read virtual image object on the backup server, a URL address, on the storage device, of the backup replica corresponding to the to-be-read virtual image object, and obtaining, from the storage device according to the URL address, on the storage device, of the backup replica corresponding to the to-be-read virtual image object, metadata in the backup replica corresponding to the to-be-read virtual image object, where the metadata includes the storage path of the address mapping bitmap of the backup data and the storage path of the backup data.

For example, as shown in FIG. 5, if the URL address of the to-be-read virtual image object may be http://BackupServer-IP/IMG-objectID-Backup-2, after receiving a read request, the HTTP server component 321 may obtain, according to the URL address of the to-be-read virtual image object, the URL address, on the storage device, of the backup replica corresponding to the to-be-read virtual image object. For example, the URL address may be http://object-storage/objectID-Backup-2, that is, a URL address of the backup-2 on the storage device. Further, the HTTP server component 321 may send a data obtaining instruction to the OSD component 322, where the data obtaining instruction carries the URL address of the backup-2 on the storage device and the address range of the target data. After receiving the data obtaining instruction, the OSD component 322 may obtain, using the HTTP object storage access client 341, metadata of the backup-2 from the storage device according to the URL address of the backup-2 on the storage device. The metadata includes a storage path of an address mapping bitmap of the backup-2 and a storage path of backup data of the backup-2.

Step S403. The backup server obtains the target data from the storage device according to the address range of the target data and the address mapping bitmap and the storage path that are of the backup data in the backup replica.

In a possible implementation, obtaining, by the backup server, the target data from the storage device according to the address range of the target data and the address mapping bitmap and the storage path that are of the backup data in the backup replica may further include obtaining, by the backup server from the storage device according to the address range of the target data and the address mapping bitmap and the storage path that are of the backup data in the backup replica, backup data that needs to be read, and obtaining, by the backup server, the target data according to the backup data that needs to be read and the address range of the target data.

Further, as shown in FIG. 5, the IO interception component 331 intercepts the data obtaining instruction sent by the OSD component 322 to the HTTP object storage access client 341, and sends the data obtaining instruction to the IO analysis component 332. As described above, the data obtaining instruction carries the identifier of the virtual image object and the address range of the target data, such as the address of 0-8 MB. Further, the IO analysis component 332 obtains, from the storage device using the HTTP object storage access client 341 and according to the address range of the target data and the address mapping bitmap and the storage path that are of the backup data in the backup replica, the backup data that needs to be read, and obtains the target data according to the backup data that needs to be read and the address range of the target data.

Optionally, obtaining, by the IO analysis component 332 from the storage device using the HTTP object storage access client 341 and according to the address range of the target data and the address mapping bitmap and the storage path that are of the backup data in the backup replica, the backup data that needs to be read includes determining, by the IO analysis component 332 according to the address range of the target data and the address mapping bitmap and the storage path that are of the backup data in the backup replica, the backup data that needs to be read, obtaining, according to the address mapping bitmap and the storage path that are of the backup data in the backup replica, a storage path, on the storage device, of the backup data that needs to be read, and creating, according to the storage path, on the storage device, of the backup data that needs to be read, a data read request for the backup data that needs to be read, where the data read request includes the storage path, on the storage device, of the backup data that needs to be read. Further, the IO analysis component 332 sends the data read request to the storage device using the HTTP object storage access client 341, and receives, using the HTTP object storage access client 341, the backup data that needs to be read and that is sent by the storage device.

For example, in a case, the address range of the target data that needs to be obtained is larger than an address range of a backup data object in the backup replica. For example, an example in which 0-8 MB data of the backup-2 needs to be obtained is used for description. As shown in FIG. 5, according to the address mapping bitmap of the backup-2, the 0-8 MB data is in two different backup data objects: "backup-2-1" (corresponding to data A1) and "backup-2-2" (corresponding to data B1). Therefore, the IO analysis component 332 needs to split a data obtaining instruction into two data read requests and send, using the HTTP object storage access client 341, the data read requests to the storage device, for example, a request for performing a Get operation on data in a backup data object corresponding to http://object-storage/objectID-Backup-2-1, and a request for performing a Get operation on data in a backup data object corresponding to http://object-storage/objectID-Backup-2-2. Further, the IO analysis component 332 of the backup server receives, using the HTTP object storage access client 341, the data of the "backup-2-1" and the data of the "backup-2-2" that are sent by the storage device.

In another case, the address range of the target data that needs to be obtained is not larger than an address range of a backup data object in the backup replica. For example, an example in which 0-2 MB data of the backup-2 needs to be obtained is used for description. As shown in FIG. 5, according to the address mapping bitmap of the backup-2, the 0-2 MB data is in "backup-2-1" (corresponding to data A1). Therefore, the IO analysis component 332 sends a data read request to the storage device using the HTTP object storage access client 341, for example, a request for performing a Get operation on data in a backup data object corresponding to http://object-storage/objectID-Backup-2-1.

It should be noted that if the address range of the target data that needs to be obtained is larger than the address range of the backup data object in the backup replica, the target data that needs to be obtained may not necessarily be all data in multiple backup data objects. For example, if 0-6 MB data of the backup-2 needs to be obtained, as shown in FIG. 5, according to the address mapping bitmap of the backup-2, the 0-6 MB data is in two different backup data objects the "backup-2-1" (corresponding to the data A1) and the "backup-2-2" (corresponding to the data B1). In this case, the IO analysis component 332 still needs to split a data obtaining instruction into two data read requests for processing. For details, refer to the implementation of the foregoing first case. Details are not described herein again in this embodiment of this application.

Optionally, obtaining, by the IO analysis component 332, the target data according to the backup data that needs to be read and the address range of the target data may include combining, by the IO analysis component 332, backup data that is of different backup data objects and that is in the backup data that needs to be read to obtain the target data if the address range of the target data is larger than an address range of a backup data object in the backup replica.

For example, according to the foregoing example, if the example in which the 0-8 MB data of the backup-2 needs to be obtained is used for description, as shown in FIG. 5, after receiving, using the HTTP object storage access client 341, the data of the "backup-2-1" and the data of the "backup-2-2" that are sent by the storage device, the IO analysis component 332 may combine the data of the "backup-2-1" and the data of the "backup-2-2" to obtain the 0-8 MB data of the backup-2, that is, the target data.

Alternatively, optionally, obtaining, by the IO analysis component 332, the target data according to the backup data that needs to be read and the address range of the target data may include capturing, by the IO analysis component 332 from the backup data that needs to be read, data corresponding to the address range of the target data, and setting the data as the target data if the address range of the target data is not larger than an address range of a backup data object in the backup replica.

For example, according to the foregoing example, if the example in which the 0-2 MB data of the backup-2 needs to be obtained is used for description, as shown in FIG. 5, the IO analysis component 332 receives, using the HTTP object storage access client 341, the data of the "backup-2-1" that is sent by the storage device. Because the data of the "backup-2-1" is 0-4 MB data of the backup-2, the IO analysis component 332 may capture the 0-2 MB data from the data of the "backup-2-1" and set the data as the target data.

It should be noted that if the address range of the target data that needs to be obtained is larger than the address range of the backup data object in the backup replica, the target data that needs to be obtained may not necessarily be all data in multiple backup data objects. For example, if 0-6 MB data of the backup-2 needs to be obtained, as shown in FIG. 5, the IO analysis component 332 receives, using the HTTP object storage access client 341, the data of the "backup-2-1" and the data of the "backup-2-2" that are sent by the storage device. Because the data of the "backup-2-2" is 5-8 MB data of the backup-2, if the IO analysis component 332 directly combines the data of the "backup-2-1" and the data of the "backup-2-2," the 0-8 MB data of the backup-2 is obtained. In this case, 5-6 MB data may be captured from the data of the "backup-2-2," and then the 5-6 MB data of the backup-2 is combined with the data of the "backup-2-1," to obtain the 0-6 MB data of the backup-2, that is, the target data. This case is not limited in this embodiment of this application, and may be implemented with reference to the foregoing two implementations.

In a possible implementation, obtaining, by the backup server, the target data from the storage device according to the address range of the target data and the address mapping bitmap and the storage path that are of the backup data in the backup replica may further include determining, by the backup server according to the address range of the target data and the address mapping bitmap of the backup data in the backup replica, backup data that needs to be read, and obtaining, according to the address mapping bitmap and the storage path that are of the backup data in the backup replica, a storage path, on the storage device, of the backup data that needs to be read if the address range of the target data is not larger than an address range of a backup data object in the backup replica, creating, by the backup server according to the storage path, on the storage device, of the backup data that needs to be read, a data read request for the backup data that needs to be read, where the data read request includes the storage path, on the storage device, of the backup data that needs to be read and the address range of the target data, sending, by the backup server, the data read request to the storage device, and receiving, by the backup server, the target data sent by the storage device.

That is, in this embodiment of this application, data may be further read from the storage device in a piece-wise reading manner, or a more specific address range may be specified.

For example, as shown in FIG. 5, the IO interception component 331 intercepts the data obtaining instruction sent by the OSD component 322 to the HTTP object storage access client 341, and sends the data obtaining instruction to the IO analysis component 332. As described above, the data obtaining instruction carries the identifier of the virtual image object and the address range of the target data. For example, using the example in which the 0-2 MB data of the backup-2 needs to be obtained for description, the address range of the target data is 0-2 MB. Further, the IO analysis component 332 may determine, according to the address mapping bitmap of the backup-2 in FIG. 5 that the 0-2 MB data is in the "backup-2-1" (corresponding to the data A1). Therefore, the IO analysis component 332 sends a data read request to the storage device using the HTTP object storage access client 341, for example, a request for performing a Get operation on the 0-2 MB data in the backup data object corresponding to http://object-storage/objectID-Backup-2-1. Further, the IO analysis component 332 may directly receive, using the HTTP object storage access client 341, the 0-2 MB data that is in the "backup-2-1" and that is sent by the storage device, that is, the target data.

Step S404. The backup server sends the target data to the block storage server.

Further, the IO analysis component 332 may send the target data to the IO interception component 331, and the IO interception component 331 sends the target data to the OSD component 322. Further, the HTTP server component 321 sends the target data to the block storage server.

It should be noted that, in the backup server 30 shown in FIG. 5, merely functional modules and interaction relationships that are required in a procedure of implementing, in a cloud data center, the data conversion method provided in the embodiment shown in FIG. 4 are shown. The functional modules and the interaction relationships are merely a part of functional modules and interaction relationships of the backup server 30 shown in FIG. 3.

Figure 6:
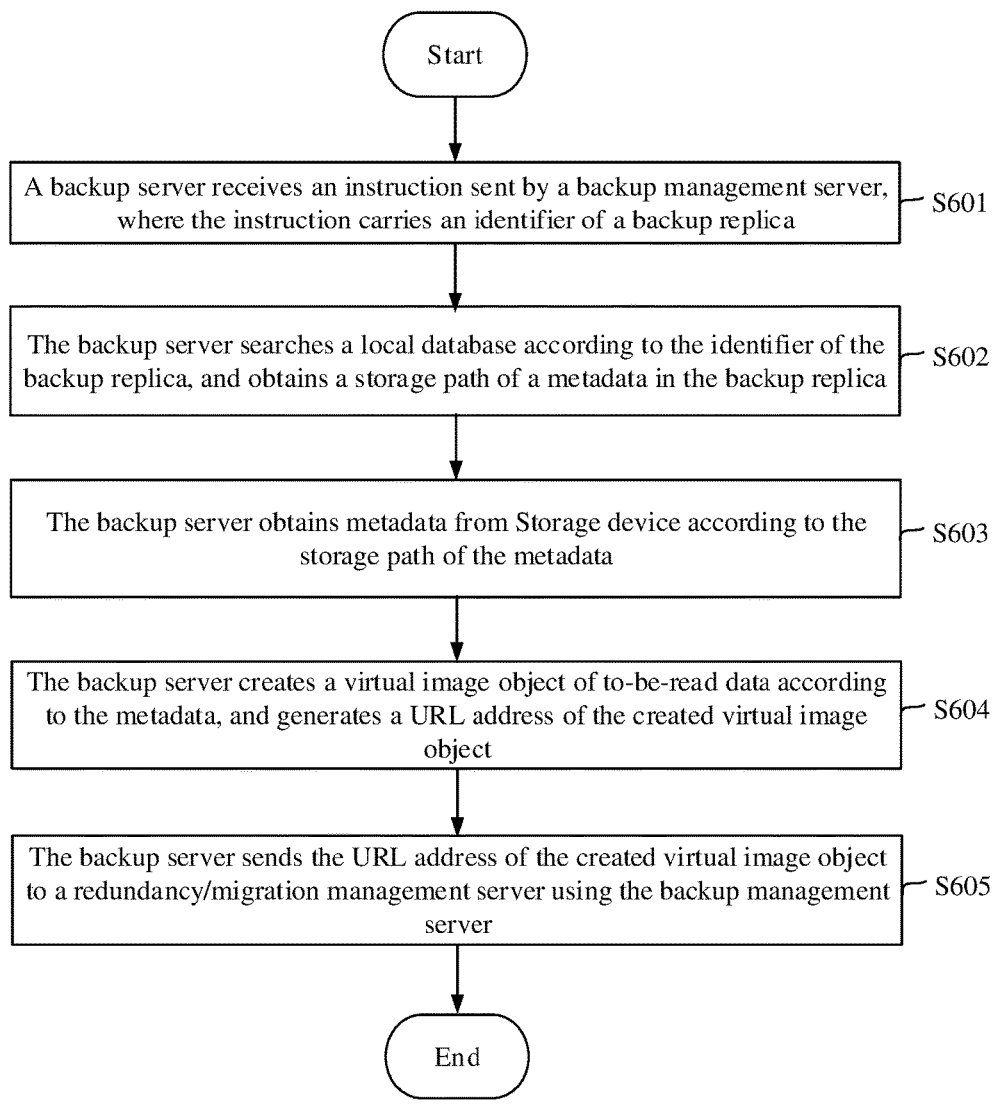
FIG. 6 is a schematic flowchart of creating a virtual image object according to an embodiment of this application.

As shown in FIG. 6, before step S401, the method may further include a procedure of creating a virtual image object in the foregoing step S6, that is, the backup server finally presents an access path of a virtual image object according to a selected backup replica. For example, the backup-2 is converted into an access path of a virtual image object: http://BackupServer-IP/IMG-objectID-Backup-2. The following describes, with reference to the backup server 30 shown in FIG. 3, a procedure of creating a virtual image object. The procedure is as follows.

Step S601. The backup server receives an instruction sent by the backup management server, where the instruction carries an identifier of a backup replica, such as the backup-2, and the instruction is used to instruct the backup server to convert a format of a backup data object that is of the backup replica and that is on the storage device, that is, convert the backup data object into an image object that can be identified by the block storage server.

Step S602. The backup server searches a local database according to the identifier of the backup replica, and obtains a storage path of metadata in the backup replica.

Further, the local database is generally a basic configuration of the backup server, and generally includes storage paths of metadata of backup replicas. Details are not described in this embodiment of this application.

Figure 7:
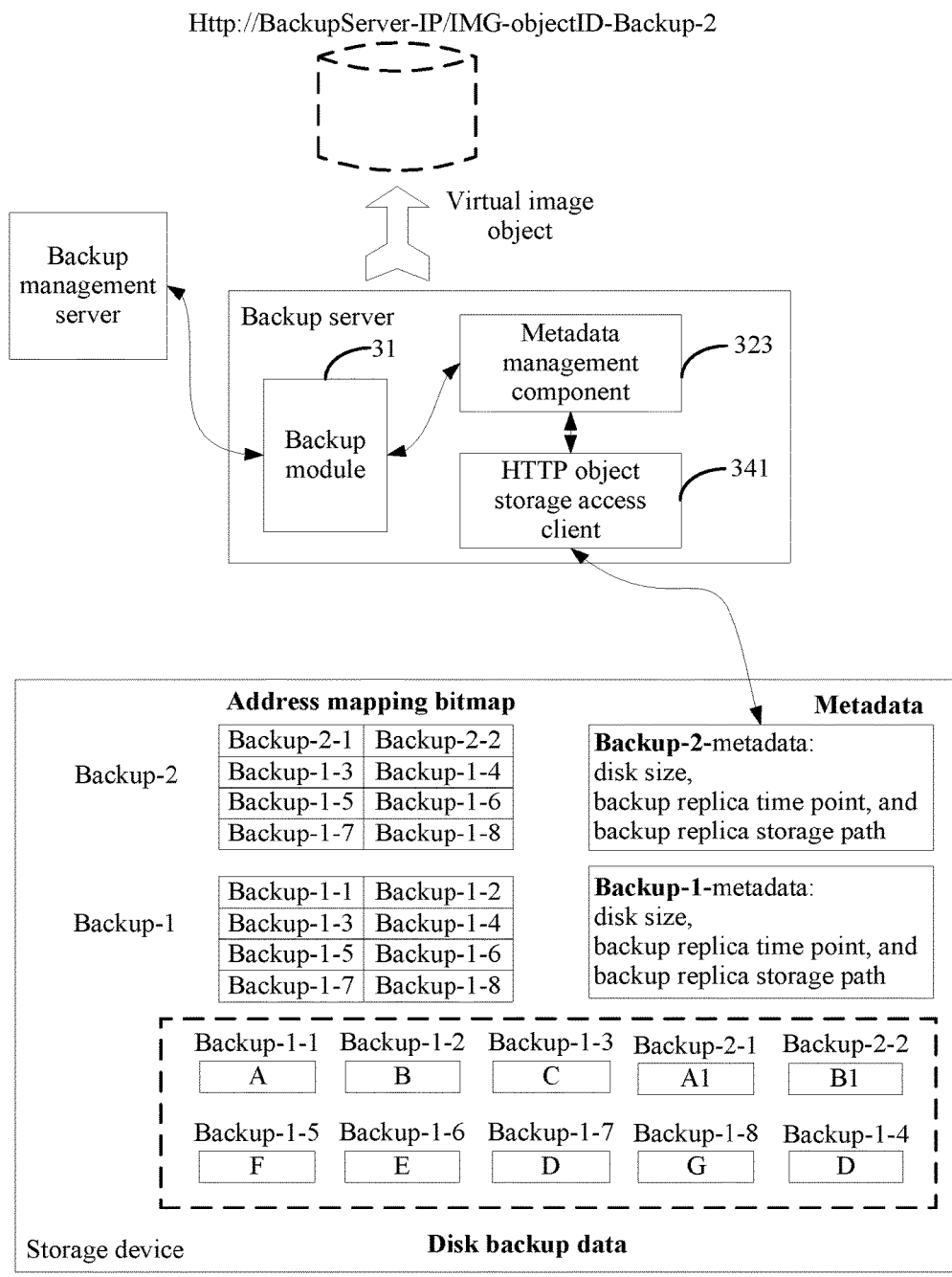
FIG. 7 is an overall schematic block diagram of creating a virtual image object according to an embodiment of this application.

Further, with reference to the backup server 30 shown in FIG. 3, FIG. 7 is an overall schematic block diagram of creating a virtual image object on the backup server 30. The backup module 31 in the backup server 30 is configured to support the backup server 30 in executing steps S601 and S602 in this embodiment of this application.

Step S603. The backup server obtains the metadata from the storage device according to the storage path of the metadata.

Further, as shown in FIG. 7, the backup module 31 in the backup server 30 sends the storage path of the metadata to the metadata management component 323. Further, the metadata management component 323 may obtain, using the HTTP object storage access client 341, metadata in a backup replica whose backup replica identifier is backup-2, and store the metadata. As shown in FIG. 7, the metadata may include a disk size, a backup replica time point, a backup replica storage path, and the like.

Step S604. The backup server creates a virtual image object of to-be-read data according to the metadata, and generates a URL address of the created virtual image object.

Further, as shown in FIG. 7, the metadata management component 323 in the backup server 30 may generate a virtual image object record according to the metadata. Information in the virtual image object record may include an identifier, a size, and the URL address of the virtual image object. The identifier of the virtual image object is automatically assigned for a new object by the metadata management component 323. The URL address of the virtual image object of the to-be-read data is generated by the metadata management component 323 in the following manner.

The metadata management component 323 in the backup server 30 may locally generate a local file on the backup server 30. The local file has no data and is used only for place holding to assist the metadata management component 323 in generating the URL address of the virtual image object. The local file may be named as IMG-objectID-Backup-2, that is, an identifier of a virtual image object of the backup-2. Further, the metadata management component 323 may generate a URL address of the virtual image object of the backup-2. The URL address may be http://BackupServer-IP/IMG-objectID-Backup-2. BackupServer-IP is an IP address of a backup server that obtains, by virtualization, the virtual image object, and IMG-objectID-Backup-2 is the identifier of the virtual image object of the backup-2.

It should be noted that, in this embodiment of this application, a procedure of generating the virtual image object record is the procedure of creating the virtual image object. Description is provided herein, and details are not described in the following again.

Step S605. The backup server sends the URL address of the created virtual image object to the redundancy/migration management server using the backup management server.

Further, as shown in FIG. 7, after generating the URL address of the created virtual image object, the metadata management component 323 in the backup server 30 may send the URL address of the created virtual image object to the backup module 31. The backup module 31 sends the URL address of the created virtual image object to the backup management server. Further, the backup management server sends the URL address of the created virtual image object to the redundancy/migration management server.

It should be noted that, in the backup server 30 shown in FIG. 7, merely functional modules and interaction relationships that are required in the procedure of creating the virtual image object in the embodiment shown in FIG. 6 and that are in a procedure of creating a cloud disk of a VM are shown. The functional modules and the interaction relationships are merely a part of functional modules and interaction relationships of the backup server 30 shown in FIG. 3.

Based on the method for implementing data conversion in a cloud data center that is provided in this embodiment of this application, in an aspect, because in this embodiment of this application, the backup server obtains, by virtualization, the virtual image object instead of generating a real image object on the storage device, storage space on the storage device can be saved for a user, and cloud data center storage costs of the user are reduced. In another aspect, in this embodiment of this application, the block storage server can directly read the backup data on the storage device using the backup server, instead of reading, by the backup server, the backup replica from the storage device, delivering a write operation request to the storage device to form an image object, and reading, by the block storage server, the backup data from the image object. Therefore, when the cloud disk of the VM is created, read IO and write IO performed for generating the real image object can be eliminated, and a conversion time of the backup data object is shortened.

The foregoing mainly describes the solutions provided in the embodiments of this application regarding the method in combination with software modules. It can be understood that, to implement the foregoing functions, a computer device includes corresponding hardware structures and/or software modules for performing the functions. Persons skilled in the art may be easily aware that, units and algorithm steps of each example described in combination with the embodiments disclosed in the specification may be implemented by hardware, or a combination of hardware and computer software. Whether a function is performed by hardware or by computer software driving hardware depends on particular applications and design constraint conditions of the technical solutions. Persons skilled in the art may use different methods to implement the described functions for each particular application, but it should not be considered that the implementation goes beyond the scope of this application.

Figure 8:
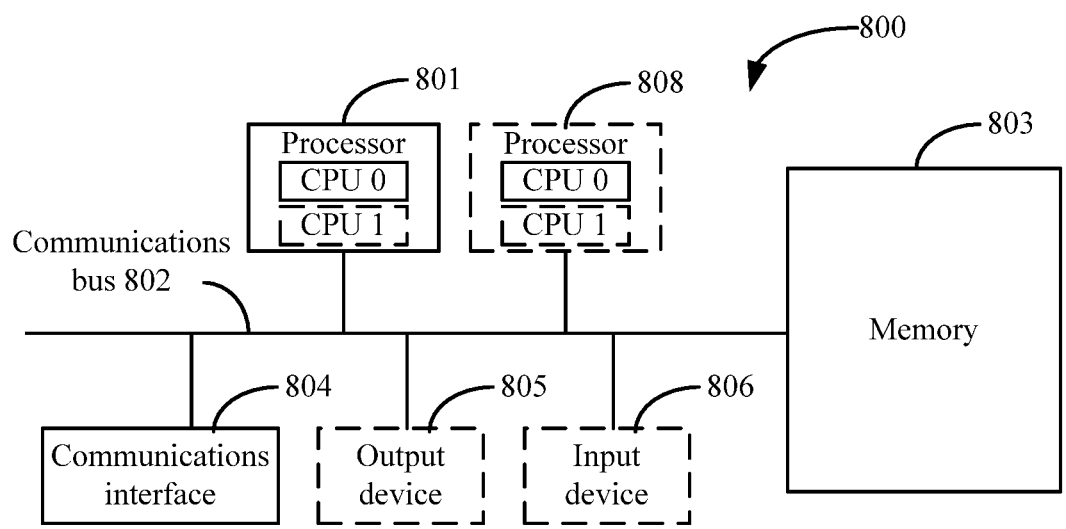
FIG. 8 is a schematic diagram of a hardware structure of a backup server according to an embodiment of this application.

Referring to FIG. 8, FIG. 8 is a schematic diagram of a hardware structure of a backup server 800 according to an embodiment of this application. The backup server 800 includes at least one processor 801, a communications bus 802, a memory 803, and at least one communications interface 804.

The processor 801 may be a general-purpose central processing unit (CPU), a microprocessor, an application-specific integrated circuit (ASIC), or one or more integrated circuits configured to control execution of programs of the solutions of this application.

The communications bus 802 may include a channel that is used to transmit information among the foregoing components.

The communications interface 804 is configured to communicate with another device or a communications network, such as the Ethernet, a radio access network (RAN), or a wireless local area network (WLAN) using any apparatus such as a transceiver.

The memory 803 may be a read-only memory (ROM), another type of static storage device that can store static information and instructions, a random access memory (RAM), or another type of dynamic storage device that can store information and instructions, or may be an electrically erasable programmable ROM (EEPROM), a compact disc ROM (CD-ROM) or another optical disk storage, an optical disc storage (including a compact optical disc, a laser disc, an optical disc, a digital versatile disc (DVD), a BLU-RAY DISC, or the like), a magnetic disk storage medium or another magnetic storage device, or any other medium that can be configured to carry or store expected program code in a form of an instruction or a data structure and that can be accessed by a computer. This does not constitute a limitation herein. The memory 803 may exist independently and is connected to the processor 801 using the communications bus 802. Alternatively, the memory 803 may be integrated with the processor 801.

The memory 803 is configured to store application program code for executing the solutions of this application, and the processor 801 controls execution of the application program code. The processor 801 is configured to execute the application program code stored in the memory 803 in order to implement the method for implementing data conversion in a cloud data center in the foregoing embodiments.

During specific implementation, in an embodiment, the processor 801 may include one or more CPUs, such as a CPU 0 and a CPU 1 in FIG. 8.

During specific implementation, in an embodiment, the backup server 800 may include multiple processors, such as the processor 801 and a processor 808 in FIG. 8. Each of the processors 801 and 808 may be a single-core processor, or may be a multi-core processor. The processors 801 and 808 herein may be one or more devices, a circuit, and/or a processing core configured to process data (e.g. a computer program instruction).

During specific implementation, in an embodiment, the backup server 800 may further include an output device 805 and an input device 806. The output device 805 communicates with the processor 801 and may display information in multiple manners. For example, the output device 805 may be a liquid crystal display (LCD), a light emitting diode (LED) display device, a cathode ray tube (CRT) display device, or a projector. The input device 806 communicates with the processor 801 and may accept user input in multiple manners. For example, the input device 806 may be a mouse, a keyboard, a touchscreen device, or a sensor device.

The backup server 800 may be a general-purpose backup server or a dedicated backup server. During specific implementation, the backup server 800 may be a desktop computer, a portable computer, a network server, a palmtop computer), a mobile phone, a tablet computer, a wireless terminal device, a communications device, an embedded device, or a device in a structure similar to that in FIG. 8. A type of the backup server 800 is not limited in this embodiment of this application.

The backup server 800 provided in this embodiment of this application may be configured to execute the foregoing method for implementing data conversion in a cloud data center. Therefore, for a technical effect that can be achieved by the backup server 800, refer to the foregoing method embodiments. Details are not described herein again in this embodiment of this application.

An embodiment of this application further provides a computer storage medium configured to store computer software instructions used by the backup server 800. The computer storage medium includes a program designed for executing the foregoing method embodiments. By executing the stored program, a data conversion method can be implemented in a cloud data center.

An embodiment of this application further provides a computer program. The computer program includes an instruction. When the computer program is executed by a computer, the computer can execute processes of the foregoing method embodiments.

Although this application is described with reference to the embodiments, in a procedure of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions listed in the claims. Some measures are recorded in dependent claims that are different from each other, but this does not mean that these measures cannot be combined to produce a better effect.

Persons skilled in the art should understand that the embodiments of this application may be provided as a method, an apparatus (device), or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with other hardware, or may use another allocation form, such as using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for implementing data conversion in a cloud data center, comprising:
   receiving, by a backup server in the cloud data center, a read request from a block storage server in the cloud data center, the read request comprising a uniform resource locator (URL) address of a to-be-read virtual image object on the backup server and an address range of target data in the to-be-read virtual image object, and the backup server storing a virtual image object corresponding to a backup replica on a storage device in the cloud data center and a URL address of the virtual image object;
   retrieving, by the backup server, an address mapping bitmap of backup data and a first storage path of the backup data in a backup replica corresponding to the to-be-read virtual image object based on the URL address of the to-be-read virtual image object;
   obtaining, by the backup server, the target data from the storage device according to the address range of the target data and the address mapping bitmap and the first storage path of the backup data; and
   sending, by the backup server, the target data to the block storage server.

2. The method of claim 1, further comprising:
   obtaining, by the backup server, an identifier of the backup replica corresponding to the to-be-read virtual image object;
   searching, by the backup server, a local database according to the identifier of the backup replica to obtain a second storage path of metadata in the backup replica corresponding to the to-be-read virtual image object;
   retrieving, by the backup server, the metadata from the storage device according to the second storage path;
   creating, by the backup server, the to-be-read virtual image object according to the metadata;
   generating, by the backup server, the URL address of the to-be-read virtual image object; and
   sending, by the backup server, the URL address to an image server.

3. The method of claim 1, wherein retrieving the address mapping bitmap and the first storage path comprises:
   identifying, by the backup server, an identifier of the to-be-read virtual image object according to the URL address of the to-be-read virtual image object on the backup server;
   retrieving, by the backup server, pre-stored metadata in the to-be-read virtual image object according to the identifier of the to-be-read virtual image object, the pre-stored metadata comprising a third storage path of the address mapping bitmap of the backup data in the backup replica corresponding to the to-be-read virtual image object and the first storage path; and
   retrieving, by the backup server, the address mapping bitmap from the storage device according to the third storage path.

4. The method of claim 1, wherein obtaining the target data from the storage device comprises:
   identifying, by the backup server, the backup data according to the address range of the target data and the address mapping bitmap when the address range of the target data is not larger than an address range of a backup data object in the backup replica corresponding to the to-be-read virtual image object;
   retrieving, a third storage path of the backup data on the storage device according to the address mapping bitmap and the first storage path;
   creating, by the backup server, a data read request comprising the third storage path and the address range of the target data for the backup data according to the third storage path;
   sending, by the backup server, the data read request to the storage device; and
   receiving, by the backup server, the target data from the storage device.

5. A backup server in a cloud data center, comprising:
   a memory storing a computer-executable instruction; and
   a processor coupled to the memory, the computer-executable instruction causing the processor to be configured to:
   receive a read request from a block storage server in the cloud data center, the read request comprising a uniform resource locator (URL) address of a to-be-read virtual image object on the backup server and an address range of target data in the to-be-read virtual image object, and the backup server storing a virtual image object corresponding to a backup replica on a storage device in the cloud data center and a URL address of the virtual image object;

retrieving an address mapping bitmap of backup data and a first storage path of the backup data in a backup replica corresponding to the to-be-read virtual image object based on the URL address;

obtaining the target data from the storage device according to the address range of the target data and the address mapping bitmap and the first storage path of the backup data; and sending the target data to the block storage server.

6. The backup server of claim 5, wherein the computer-executable instruction further causes the processor to be configured to:

obtain an identifier of the backup replica corresponding to the to-be-read virtual image object;

search a local database according to the identifier of the backup replica to obtain a second storage path of metadata in the backup replica corresponding to the to-be-read virtual image object;

retrieve the metadata from the storage device according to the second storage path;

create the to-be-read virtual image object according to the metadata;

generate the URL address of the to-be-read virtual image object; and send the URL address to an image server.

7. The backup server of claim 5, wherein when retrieving the address mapping bitmap and the first storage path, the computer-executable instruction further causes the processor to be configured to:

identify an identifier of the to-be-read virtual image object according to the URL address of the to-be-read virtual image object on the backup server;

retrieve pre-stored metadata in the to-be-read virtual image object according to the identifier of the to-be-read virtual image object, the pre-stored metadata comprising a third storage path of the address mapping bitmap of the backup data in the backup replica corresponding to the to-be-read virtual image object and the first storage path; and retrieve the address mapping bitmap from the storage device according to the third storage path.

8. The backup server of claim 5, wherein when obtaining the target data from the storage device, the computer-executable instruction further causes the processor to be configured to:

identify the backup data according to the address range of the target data and the address mapping bitmap when the address range of the target data is not larger than an address range of a backup data object in the backup replica corresponding to the to-be-read virtual image object;

retrieve a third storage path of the backup data on the storage device according to the address mapping bitmap and the first storage path;

create a data read request comprising the third storage path and the address range of the target data for the backup data according to the third storage path;

send the data read request to the storage device; and receive the target data from the storage device.

9. A computer program product comprising a non-transitory computer readable storage medium storing program code thereon for implementing data conversion in a cloud data center, the program code comprising instructions for executing a method that comprises:

receiving, by a backup server in the cloud data center, a read request from a block storage server in the cloud data center, the read request comprising a uniform resource locator (URL) address of a to-be-read virtual image object on the backup server and an address range of target data in the to-be-read virtual image object, and the backup server storing a virtual image object corresponding to a backup replica on a storage device in the cloud data center and a URL address of the virtual image object;

retrieving, by the backup server, an address mapping bitmap of backup data and a first storage path of the backup data in a backup replica corresponding to the to-be-read virtual image object based on the URL address of the to-be-read virtual image object;

obtaining, by the backup server, the target data from the storage device according to the address range of the target data and the address mapping bitmap and the first storage path of the backup data; and sending, by the backup server, the target data to the block storage server.

10. The computer program product of claim 9, further comprising:

obtaining, by the backup server, an identifier of the backup replica corresponding to the to-be-read virtual image object;

searching, by the backup server, a local database according to the identifier of the backup replica to obtain a second storage path of metadata in the backup replica corresponding to the to-be-read virtual image object;

retrieving, by the backup server, the metadata from the storage device according to the second storage path;

creating, by the backup server, the to-be-read virtual image object according to the metadata;

generating, by the backup server, the URL address of the to-be-read virtual image object; and sending, by the backup server, the URL address to an image server.

11. The computer program product of claim 9, wherein retrieving the address mapping bitmap and the first storage path comprises:

identifying, by the backup server, an identifier of the to-be-read virtual image object according to the URL address of the to-be-read virtual image object on the backup server;

retrieving, by the backup server, pre-stored metadata in the to-be-read virtual image object according to the identifier of the to-be-read virtual image object, the pre-stored metadata comprising a third storage path of the address mapping bitmap of the backup data in the backup replica corresponding to the to-be-read virtual image object and the first storage path; and retrieving, by the backup server, the address mapping bitmap from the storage device according to the third storage path.

12. The computer program product of claim 9, wherein obtaining the target data from the storage device comprises:

identifying, by the backup server, the backup data according to the address range of the target data and the address mapping bitmap when the address range of the target data is not larger than an address range of a backup data object in the backup replica corresponding to the to-be-read virtual image object;

retrieving, a third storage path of the backup data on the storage device according to the address mapping bitmap and the first storage path;

creating, by the backup server, a data read request comprising the third storage path and the address range of the target data for the backup data according to the third storage path;

sending, by the backup server, the data read request to the storage device; and receiving, by the backup server, the target data from the storage device.

* * * * *